United States Patent
Chen et al.

(10) Patent No.: US 12,470,710 B2
(45) Date of Patent: Nov. 11, 2025

(54) UNIFICATION OF CONTEXT-CODED BINS (CCB) COUNT METHOD

(71) Applicant: InterDigital CE Patent Holdings, SAS, Paris (FR)

(72) Inventors: Ya Chen, Cesson-Sevigne (FR); Fabrice Le Leannec, Betton (FR); Franck Galpin, Cesson-Sevigne (FR); Karam Naser, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 505 days.

(21) Appl. No.: 17/619,442

(22) PCT Filed: Sep. 18, 2020

(86) PCT No.: PCT/EP2020/076067
§ 371 (c)(1),
(2) Date: Dec. 15, 2021

(87) PCT Pub. No.: WO2021/058381
PCT Pub. Date: Apr. 1, 2021

(65) Prior Publication Data
US 2022/0141466 A1  May 5, 2022

(30) Foreign Application Priority Data
Sep. 23, 2019 (EP) .................... 19306161

(51) Int. Cl.
*H04N 19/12* (2014.01)
*H04N 19/176* (2014.01)
(Continued)

(52) U.S. Cl.
CPC ........... *H04N 19/12* (2014.11); *H04N 19/176* (2014.11); *H04N 19/61* (2014.11); *H04N 19/70* (2014.11)

(58) Field of Classification Search
CPC ...... H04N 19/176; H04N 19/61; H04N 19/91; H04N 19/12; H04N 19/467; H04N 19/50;
(Continued)

(56) References Cited

U.S. PATENT DOCUMENTS
2019/0387231 A1*  12/2019  Coban .................... H04N 19/12

FOREIGN PATENT DOCUMENTS
CN      106416246 A    2/2017
GB      2487078 A      7/2012
(Continued)

OTHER PUBLICATIONS

Chen et al. ("Algorithm description for Versatile Video Coding and Test Model 6 (VTM 6)", Joint Video Experts Team (JVET) of ITU-T SG 16 WP 3 and ISO/IEC JTC 1/SC 29/WG 11 Document: JVET-O2002-v1 15th Meeting: Gothenburg, SE, Jul. 3-12, 2019) (Year: 2019).*

(Continued)

*Primary Examiner* — Masum Billah
(74) *Attorney, Agent, or Firm* — Xiaoan Lu

(57) ABSTRACT

In one implementation, the CCB counting methods are unified between the transform residual coding process and Transform Skip (TS) residual coding process. In one example, in TS residual coding, the CCB counting excludes the coeff_sign_flag so that syntax used for CCB count is unified for the two residual coding processes. In addition, a separate maximum number of context coded bins can be specified and used for coeff_sign_flag only. In another example, in TS residual coding, the maximum number of CCB count is reduced from TB_size*2 for a TB to TB_size*1.75, or more generally both the maximum CCB counts of the transform residual coding and TS residual coding are set to an identical value, so that the maximum CCB count is unified for the two residual coding processes.

19 Claims, 11 Drawing Sheets

(51) Int. Cl.
*H04N 19/61* (2014.01)
*H04N 19/70* (2014.01)

(58) Field of Classification Search
CPC ...... H04N 19/52; H04N 19/40; H04N 19/513;
H04N 19/577; H04N 19/93; H04N 19/96;
H04N 19/107
USPC .......................................................... 375/240
See application file for complete search history.

(56) References Cited

FOREIGN PATENT DOCUMENTS

| | | |
|---|---|---|
| JP | 2022512090 A | 2/2022 |
| WO | WO2020139774 A1 | 7/2020 |

OTHER PUBLICATIONS

Coban, "CE8(7)-related: Alignment of No. of context coded bins per coefficients for TS residual coding and transform coefficient coding", Document: JVET-O1169, Joint Video Experts Team (JVET), of ITU-T SG 16 WP 3 and ISO/IEC JTC 1/SC 29/WG 11, 15th Meeting: Gothenburg, SE, pp. 1-4, Jul. 3-12, 2019.

Chen et al., "Algorithm description for Versatile Video Coding and Test Model 6 (VTM 6)", Document: JVET-O2002- v1, Joint Video Experts Team (JVET) of ITU-T SG 16 WP 3 and ISO/IEC JTC 1/SC 29/WG 11, 15th Meeting: Gothenburg, SE, pp. 1-80, Jul. 3-12, 2019.

Chen et al., Algorithm description for Versatile Video Coding and Test Model 1(VTM 1); Document: JVET-J1002-v2, Joint Video Experts Team (JVET) of ITU-T SG 16 WP 3 and ISO/IEC JTC 1/SC 29/WG 11, 10th Meeting: San Diego, US, pp. 1-9, Apr. 10-20, 2018.

Kato et al., "Non-CE7: Unification of CCB count method between transform residual and transform skip residual", Document: JVET-O0409-v2, Joint Video Exploration Team (JVET) of ITU-T SG 16 WP 3 and ISO/IEC JTC 1/SC 29/ WG 11, 15th Meeting: Gothenburg, SE, pp. 1-6, Jul. 3-12, 2019.

Kato et al., "Non-CE7: Unification of syntaxes after CCB count exceeds the maximum number between transform residual and transform skip residual", Document: JVET-O0406-v2, Joint Video Exploration Team (JVET) of ITU-T SG 16 WP 3 and ISO/IEC JTC 1/SC 29/WG 11, 15th Meeting: Gothenburg, SE, pp. 1-12, Jul. 3-12, 2019.

Anonymous, "High Efficiency Coding", Series H: Audiovisual and Multimedia Systems, Infrastructure of audiovisual services-Coding of moving video, ITU-T Telecommunication Standardization Sector of ITU, pp. 1-638, H.265, Apr. 2015.

Chen et al., "CE7-related: Unification of CCB count method between transform residual and transform skip residual coding", Document: JVET-P0402-v1, Joint Video Experts Team (JVET) of ITU-T SG 16 WP 3 and ISO/IEC JTC 1/SC 29/WG 11 16th Meeting: Geneva, CH, Oct. 1-11, 2019, 8 pages.

\* cited by examiner

UNIFICATION OF CONTEXT-CODED BINS (CCB) COUNT METHOD

This application claims the benefit, under 35 U.S.C. § 371 of International Application No. PCT/EP2020/076067, filed Sep. 18, 2020, which was published on Apr. 1, 2021, which claims the benefit of European Patent Application No. EP19306161.1 filed Sep. 23, 2019.

TECHNICAL FIELD

The present embodiments generally relate to unifying the context-coded bins (CCB) scheme for transform residual and transform skip residual modes.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an embodiment, a method of video encoding is provided, comprising: obtaining prediction residuals for a block to be encoded in a picture; counting a number of context-coded bins used to encode prediction residuals in said block, wherein said prediction residuals of said block are to be encoded using one of a transform residual coding process and a transform skip residual coding process, wherein said transform residual coding process and said transform skip residual coding process use a same bound to limit said number of context-coded bins; and adjusting an entropy coding method of one or more syntax elements in said one of a transform residual coding process and a transform skip residual coding process, responsive to said bound and said number of context-coded bins.

According to another embodiment, a method of video decoding is provided, comprising: counting a number of context-coded bins used to decode prediction residuals in said block, wherein said prediction residuals of said block are to be decoded using one of a transform residual decoding process and a transform skip residual decoding process, wherein said transform residual decoding process and said transform skip residual decoding process use a same bound to limit said number of context-coded bins; adjusting an entropy decoding method of one or more syntax elements in said one of a transform residual decoding process and a transform skip residual decoding process, responsive to said bound and said number of context-coded bins; and obtaining prediction residuals for a block to be decoded in a picture.

According to another embodiment, an apparatus for video encoding, comprising one or more processors, wherein said one or more processors are configured to: obtain prediction residuals for a block to be encoded in a picture; count a number of context-coded bins used to encode prediction residuals in said block, wherein said prediction residuals of said block are to be encoded using one of a transform residual coding process and a transform skip residual coding process, wherein said transform residual coding process and said transform skip residual coding process use a same bound to limit said number of context-coded bins; and adjust an entropy coding method of one or more syntax elements in said one of a transform residual coding process and a transform skip residual coding process, responsive to said bound and said number of context-coded bins.

According to another embodiment, an apparatus for video decoding, comprising one or more processors, wherein said one or more processors are configured to: count a number of context-coded bins used to decode prediction residuals in said block, wherein said prediction residuals of said block are to be decoded using one of a transform residual decoding process and a transform skip residual decoding process, wherein said transform residual decoding process and said transform skip residual decoding process use a same bound to limit said number of context-coded bins; adjust an entropy decoding method of one or more syntax elements in said one of a transform residual decoding process and a transform skip residual decoding process, responsive to said bound and said number of context-coded bins; and obtain prediction residuals for a block to be decoded in a picture.

One or more embodiments also provide a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

DETAILED DESCRIPTION

Figure 1:
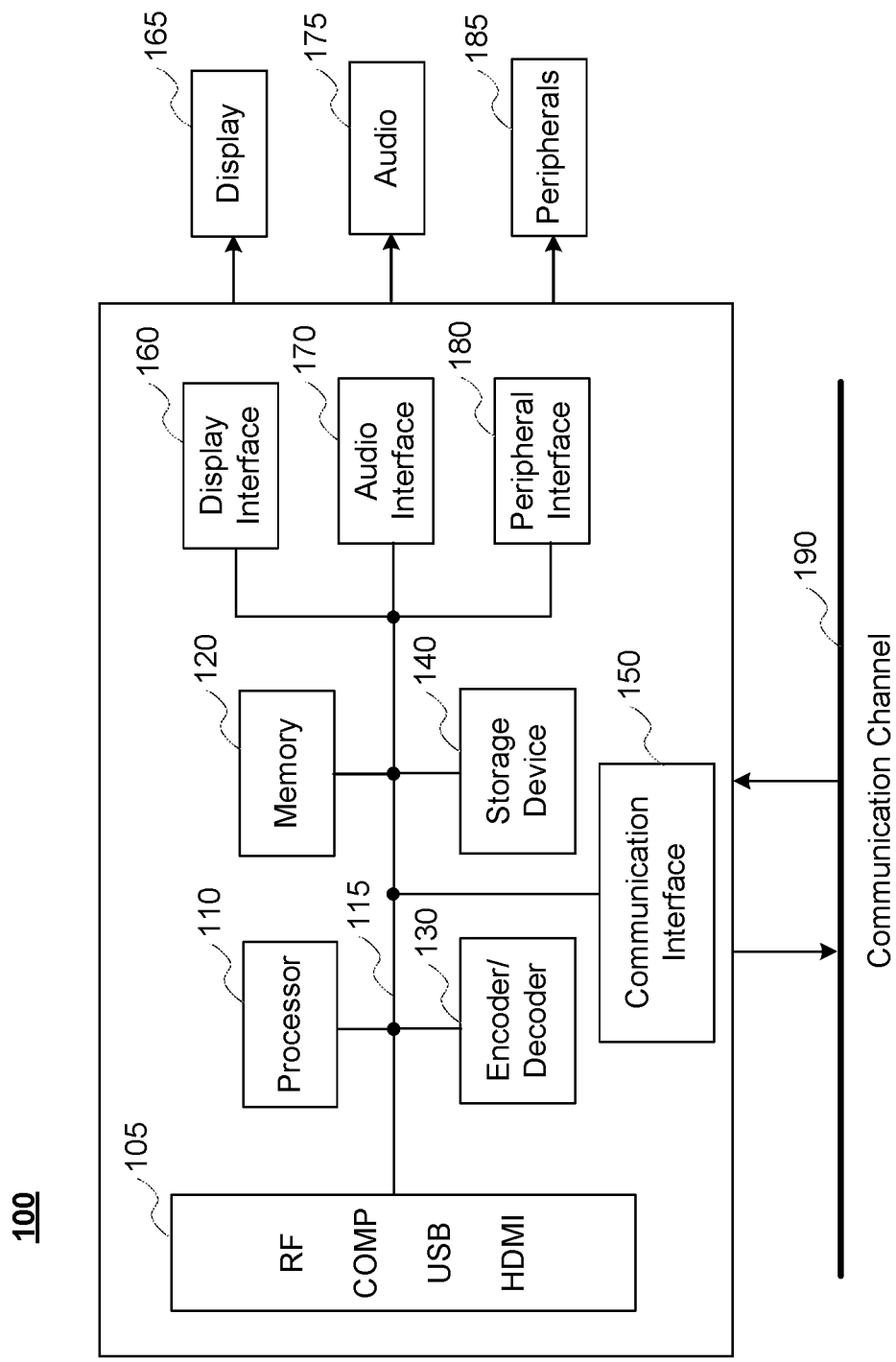
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
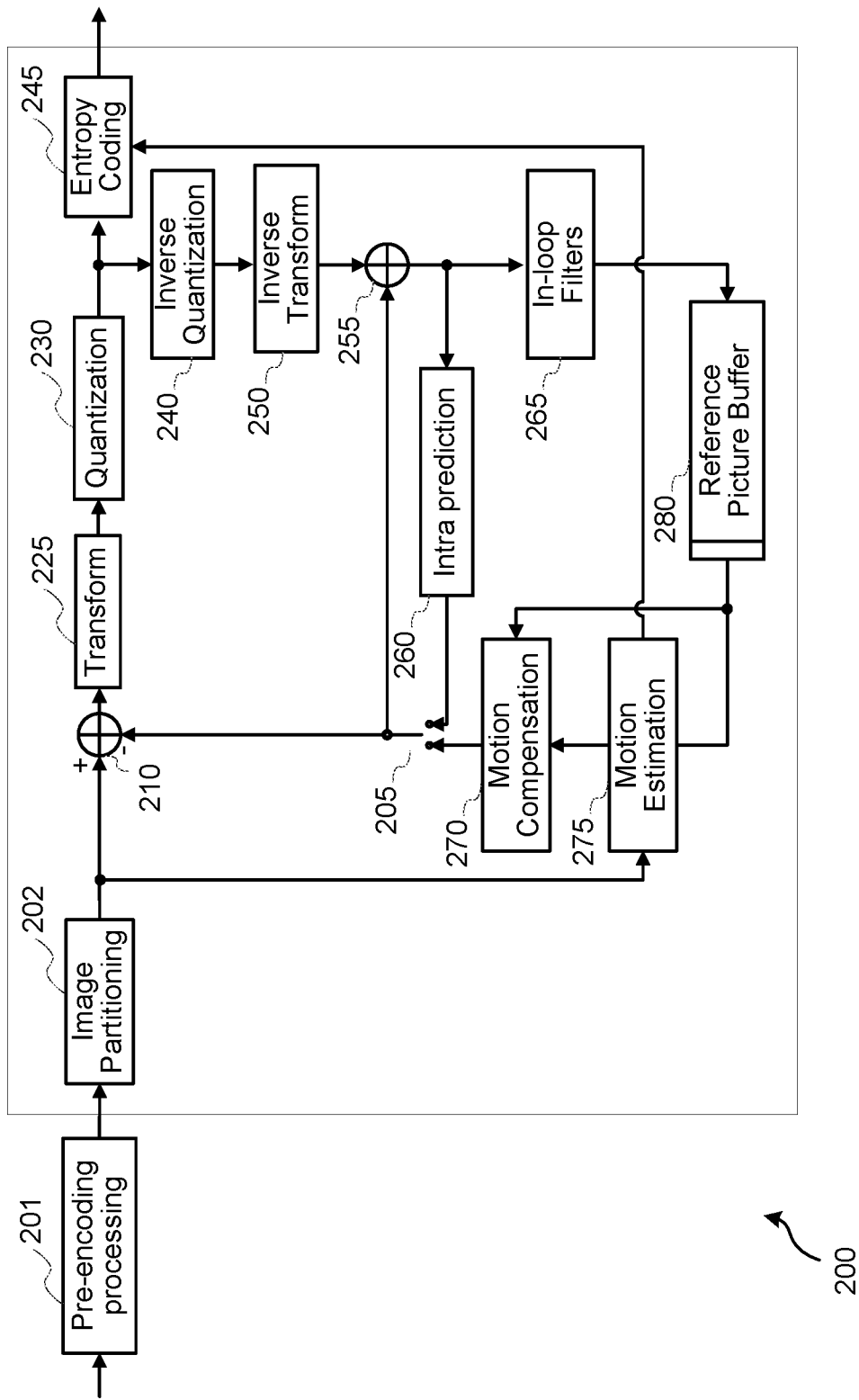
FIG. 2 illustrates a block diagram of an embodiment of a video encoder.

FIG. 2 illustrates an example video encoder 200, such as a High Efficiency Video Coding (HEVC) encoder. FIG. 2 may also illustrate an encoder in which improvements are made to the HEVC standard or an encoder employing technologies similar to HEVC, such as a VVC (Versatile Video Coding) encoder under development by JVET (Joint Video Exploration Team).

In the present application, the terms "reconstructed" and "decoded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

To encode a video sequence with one or more pictures, a picture is partitioned (202), for example, into one or more slices where each slice can include one or more slice segments. In HEVC, a slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding according to HEVC, a picture is partitioned into coding tree blocks (CTB) of square shape with a configurable size (typically at 64×64, 128×128, or 256×256 pixels), and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). A Transform Block (TB) larger than 4×4 is divided into 4×4 sub-blocks of quantized coefficients called Coefficient Groups (CG). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CG, CB, PB, and TB. In addition, the term "block" can also be used to refer to a macroblock and a partition as specified in H.264/AVC or other video coding standards, and more generally to refer to an array of data of various sizes.

In the encoder 200, a picture is encoded by the encoder elements as described below. The picture to be encoded is processed in units of, for example, CUs. Each coding unit is encoded using either an intra or inter mode. When a coding unit is encoded in an intra mode, it performs intra prediction (260). In an inter mode, motion estimation (275) and compensation (270) are performed. The encoder decides (205) which one of the intra mode or inter mode to use for encoding the coding unit, and indicates the intra/inter decision by a prediction mode flag. Prediction residuals are calculated by subtracting (210) the predicted block from the original image block.

The prediction residuals are then transformed (225) and quantized (230). The quantized transform coefficients, as well as motion vectors and other syntax elements, are entropy coded (245) to output a bitstream. As a non-limiting example, context-based adaptive binary arithmetic coding (CABAC) can be used to encode syntax elements into the bitstream.

To encode with CABAC, a non-binary syntax element value is mapped to a binary sequence, called a bin string, through a binarization process. For a bin, a context model is selected. A "context model" is a probability model for one or more bins and is chosen from a selection of available models depending on the statistics of recently coded symbols. The context model of each bin is identified by a context model index (also used as "context index"), and different context indices correspond to different context models. The context model stores the probability of each bin being '1' or '0', and can be adaptive or static. The static model triggers a coding engine with an equal probability for bins '0' and '1'. In the adaptive coding engine, the context model is updated based on the actual coded value of a bin. The operation modes corresponding to the adaptive and static models are called the regular mode and the bypass mode, respectively. Based on the context, a binary arithmetic coding engine encodes or decodes a bin according to the corresponding probability model.

The encoder may also skip the transform and apply quantization directly to the non-transformed residual signal, for example, on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture, for example, to perform deblocking/SAO (Sample Adaptive Offset) filtering to reduce encoding artifacts. The filtered image is stored at a reference picture buffer (280).

Figure 3:
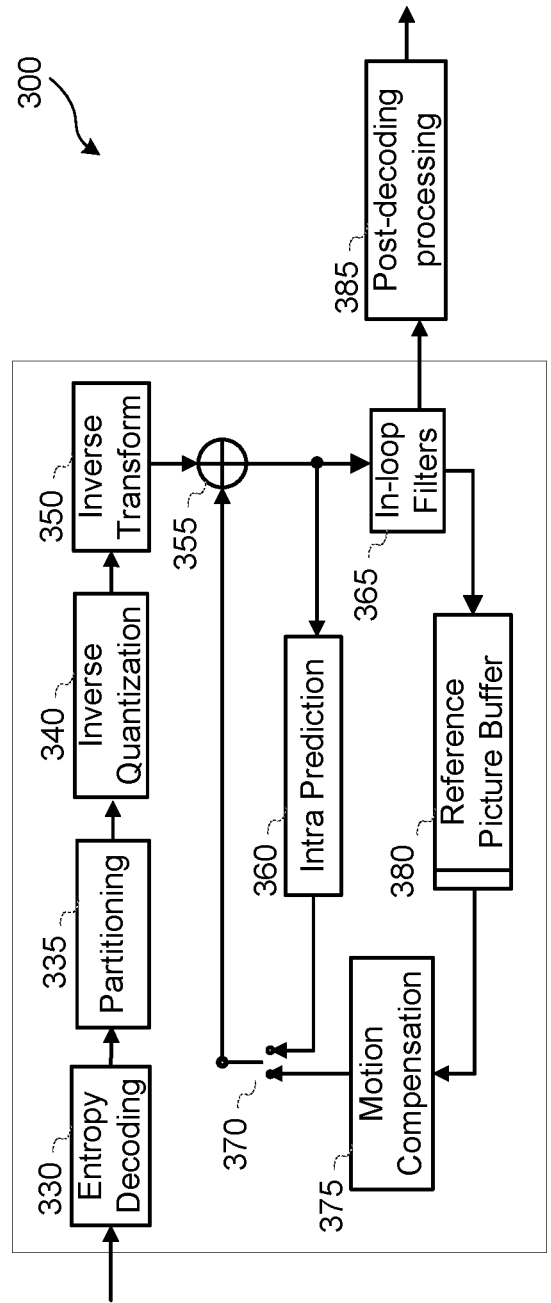
FIG. 3 illustrates a block diagram of an embodiment of a video decoder.
Figure 4:
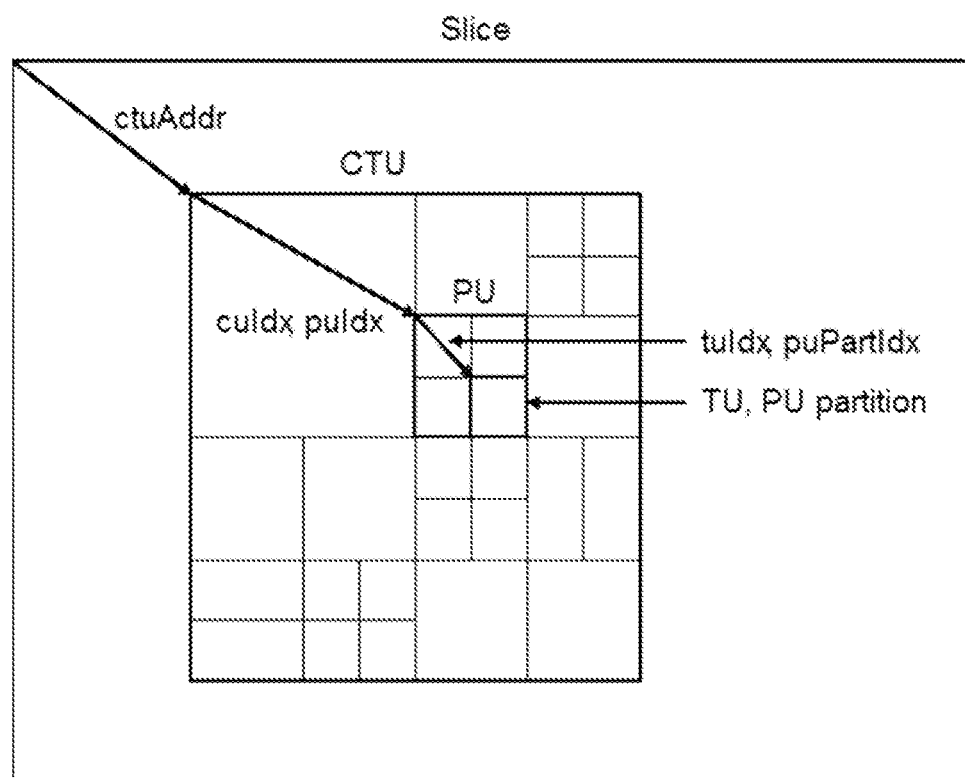
FIG. 4 illustrates Coding Tree Unit and Coding Tree concepts to represent a compressed picture.

FIG. 3 illustrates a block diagram of an example video decoder 300, such as an HEVC decoder. In the decoder 300, a bitstream is decoded by the decoder elements as described below. Video decoder 300 generally performs a decoding pass reciprocal to the encoding pass as described in FIG. 2, which performs video decoding as part of encoding video data. FIG. 3 may also illustrate a decoder in which improvements are made to the HEVC standard or a decoder employing technologies similar to HEVC, such as a VVC decoder.

In particular, the input of the decoder includes a video bitstream, which may be generated by video encoder 200. The bitstream is first entropy decoded (330) to obtain transform coefficients, motion vectors, picture partitioning information, and other coded information. If CABAC is used for entropy coding, the context models are initialized in the same manner as the encoder context models, and syntax elements are decoded from the bitstream based on the context models.

The picture partitioning information indicates how the picture is partitioned, for example, the size of the CTUs, and a manner a CTU is split into CUs, and possibly into PUs when applicable. The decoder may therefore divide (335) the picture, for example, into CTUs, and each CTU into CUs, according to the decoded picture partitioning information. The transform coefficients are de-quantized (340) and inverse transformed (350) to decode the prediction residuals.

Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g., conversion from YCbCr 4:2:0 to RGB 4:4:4) or an inverse remapping performing the inverse of the remapping process performed in the pre-encoding processing (201). The post-decoding processing may use metadata derived in the pre-encoding processing and signaled in the bitstream.

In HEVC, transform coefficients of a coding block are coded using non-overlapped coefficient groups (CGs or sub-blocks), and each CG contains the coefficients of a 4×4 block of a coding block. In VVC Draft 6, the selection of coefficient group sizes becomes dependent upon TB size only, i.e., removes the dependency on channel type. As a consequence, various CGs (1×16, 2×8, 8×2, 2×4, 4×2 and 16×1) become available. The CGs inside a coding block, and the transform coefficients within a CG, are coded according to pre-defined scan orders.

Figure 7:
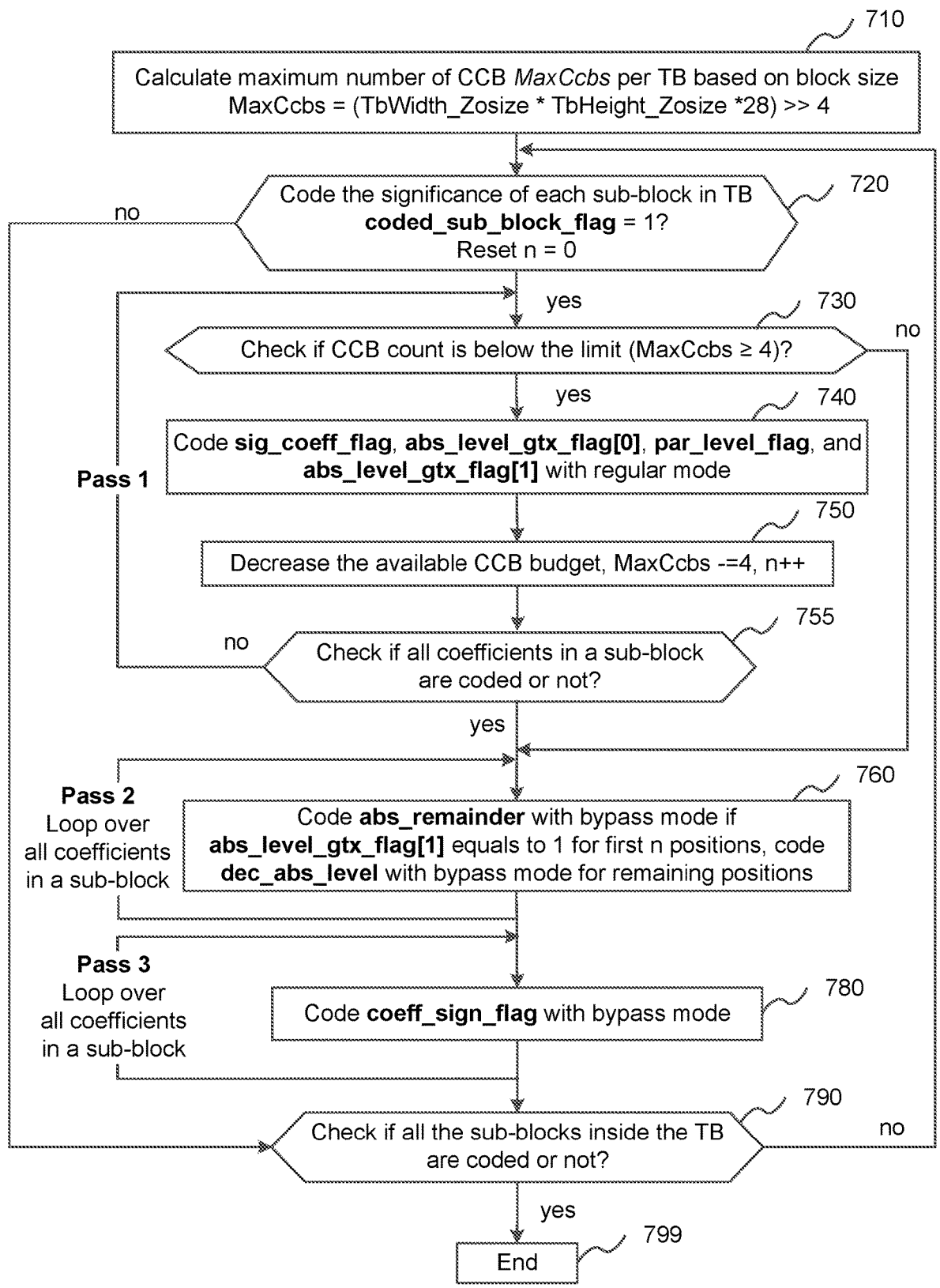
FIG. 7 illustrates the residual coding process for a transform block in VTM 6.0.
Figure 8:
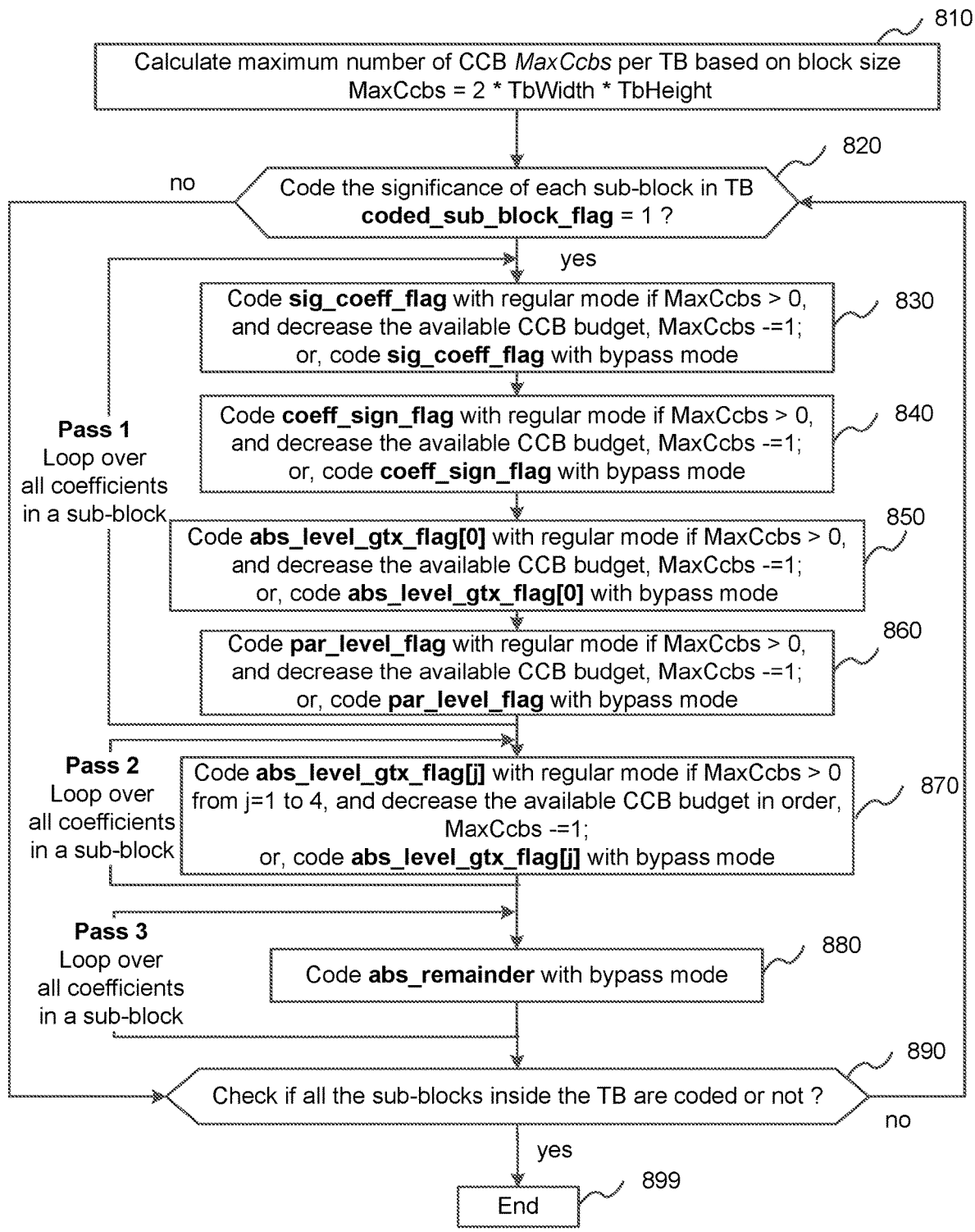
FIG. 8 illustrates the residual coding process for a transform skip block in VTM 6.0.

In order to restrict the maximum number of context-coded bins (bins coded in the regular mode) per pixel, the area of the TB is used to derive the maximum number of context-coded bins allowed for a TB in VVC Draft 6 (see "Algorithm description for Versatile Video Coding and Test Model 6 (VTM 6)," Document JVET-O2002, 15$^{th}$ Meeting: Gothenburg, SE, 3-12 Jul. 2019). FIG. 7 illustrates the residual coding process for a transform block in VTM 6.0, and FIG. 8 shows the residual coding process for a transform skip block in VTM 6.0. For a TB, the maximum number of context-coded bins (CCB) is set to TB_zosize*1.75 as shown in step 710 in FIG. 7, where TB_zosize indicates the number of samples within a TB excluding the coefficients that are zeroed out. It is known that large block partitions typically present less residuals and the energy is more concentrated in low-frequency coefficients in the transform domain. In VTM (VVC Test Model) 6.0, high frequency transform coefficients outside 32×32 regions are zeroed out for the transform blocks with size greater than 32. Note that the coded_sub_block_flag is not considered for CCB count as shown in step 720 in FIG. 7.

VTM 6.0 allows the transform skip mode to be used for Luma blocks of size up to 32×32 (inclusive). When a CU is coded in the transform skip mode, its prediction residual is quantized (without transform, i.e., transform skipped) and coded using the transform skip residual coding process. Unlike HEVC where residual coding is designed for the statistics and signal characteristics of transform coefficient levels, two separate residual coding structures are employed for transform residuals (residuals that are transformed, where transforms are not skipped) and transform skip residuals (residuals not transformed, where transforms are skipped), respectively. For example, the maximum number of CCB is set to TB_size*2 in the transform skip mode as shown in step 810 in FIG. 8, where TB_size indicates the number of samples within a TB. Also the coeff_sign_flag in the transform skip residual mode is context coded and is considered for the CCB count as shown in step 840 in FIG. 8. The residual coding for transform residuals is also referred to as "transform coefficients coding," "transform residual coding," or "residual coding for transform coefficients." The residual coding for transform skip residuals is also referred to as "Transform Skip (TS) residual coding."

Residual Coding for Transform Coefficients

In VVC draft 6, to encode the transform coefficients, the bins for a CG (sub-block) are coded in multiple passes over the scan positions in a CG if the significance of this CG equals to 1 (720):

pass 1: significance (sig_coeff_flag), greater than 1 flag (gt1, abs_level_gtx_flag[0]), parity flag (PAR, par_level_flag), and greater than 3 flag (gt3, abs_level_gtx_flag[1]) are coded in the coding order. The greater than 1 flags are only present if sig_coeff_flag is equal to 1. Coding of parity flags and greater than 3 flags (abs_level_gtx_flag[1]) is only performed for scan positions with abs_level_gtx_flag[0] equal to 1. The values of gt1, PAR and gt3 are inferred to be 0 if not present in the bitstream. The SIG, PAR, gt1 and gt3 flags are coded in the regular mode (740). MaxCcbs is decremented by 4 after these flags are coded for a coefficient, and a counter n is incremented by 1 to keep track of the number of coefficients in the sub-block whose SIG, PAR, gt1 and gt3 flags are coded in the regular mode (750), wherein n is reset as 0 for each sub-block. Pass 1 stops if all coefficients in the sub-block are coded (755) or the CCB count reaches the limit (730), and thus, coding for some scan positions may be skipped in pass 1.

pass 2: for scan positions that are coded in pass 1, syntax element abs_remainder is coded for a scan position with gt3 equal to 1 (760). The non-binary syntax element is binarized using Golomb-rice code and the resulting bins are coded in the bypass mode of the arithmetic coding engine. For scan positions that are not coded in pass 1, syntax element dec_abs_level is binarized using Golomb-rice code and the resulting bins are coded in the bypass mode (760).

pass 3: the signs (coeff_sign_flag) for all scan positions with sig_coeff_flag equal to 1 are coded. Signs are coded in the bypass mode (780).

As described above, in transform coefficient coding, a variable, remBinsPass1 (MaxCcbs), is first set to the maximum number of context-coded bins (MCCB) and is decreased by one when a context-coded bin is signalled. While the remBinsPass1 is larger than or equal to four, the flags in the first coding pass, which includes the sig_coeff_flag, abs_level_gtx_flag[0] (gt1, greater than 1 flag), par_level_flag, and abs_level_gtx_flag[1] (gt3, greater than 3 flag), are coded by using context-coded bins. If the number of context-coded bin is not greater than MCCB in the first pass coding, the remaining part of level information, which is indicated in the first pass to be further coded, is coded with syntax element of abs_remainder by using Golomb-rice code and bypass-coded bins. When the remBinsPass1 becomes smaller than 4, the remaining coefficients that are not coded in the first pass are directly coded in the second pass with the syntax element dec_abs_level by using Golomb-Rice code and bypass-coded bins. The remBinsPass1 is reset for every TB. The transition of using context-coded bins for the sig_coeff_flag, abs_level_gtx_flag[0], par_level_flag, and abs_level_gtx_flag[1] to using bypass-coded bins for the remaining syntax elements only happens at most once per TB. For a coefficient sub-block, if the remBinsPass1 is smaller than 4, the entire coefficient sub-block is coded by using bypass-coded bins. After all the above mentioned level coding, the signs (coeff_sign_flag) for all scan positions with sig_coeff_flag equal to 1 is finally bypass coded. The process is performed for all sub-blocks in the transform block (790) before it ends (799).

Figure 5:
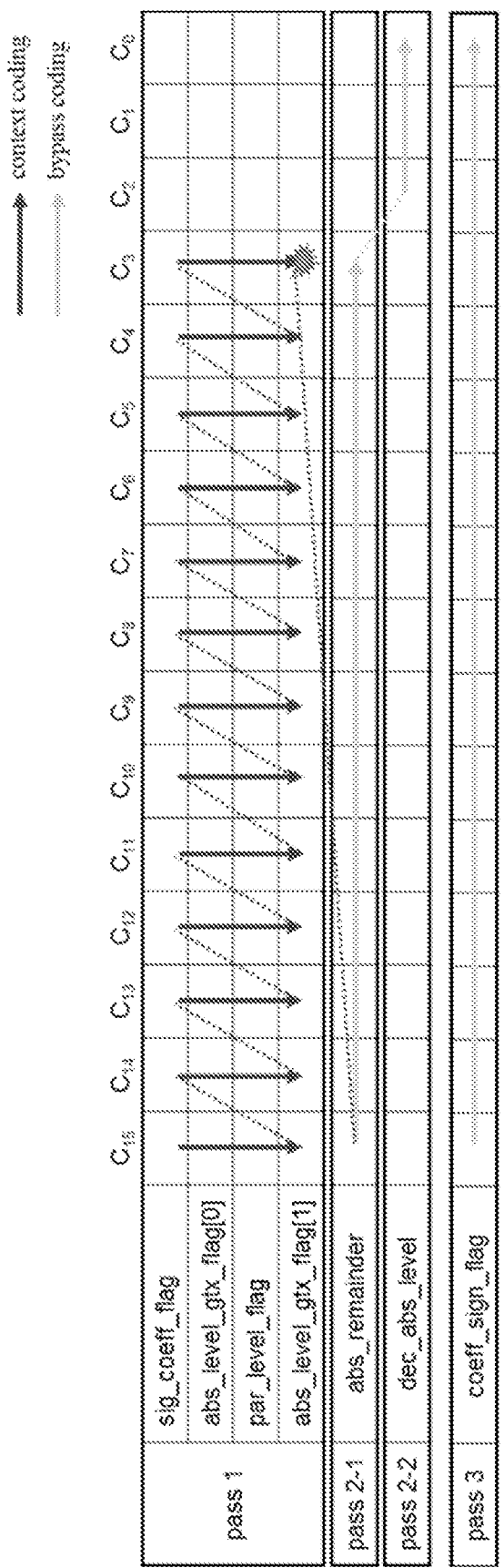
FIG. 5 illustrates the residual coding structure for transform blocks.

For example, in FIG. 5, after encoding sig_coeff_flag, abs_level_gtx_flag[0], par_level_flag, and abs_level_gtx_flag[1] with regular mode for scan positions $C_{15}$, ..., $C_3$, the number of CCB reaches the limit and pass 1 coding stops. In pass 2, abs_remainder are bypass coded for scan positions $C_{15}$, ..., $C_3$ if pass 1 indicates that more level information is to be coded for the current scan position. Scan positions $C_2$, $C_1$ and $C_0$ are not coded in pass 1, and the absolute coefficient levels for these positions are directly coded with syntax element dec_abs_level using bypass mode. In pass 3, syntax element coeff_sign_flag is bypass coded if the coefficient at the current scan position is not zero.

Residual Coding for Transform Skip

In the transform skip mode, the statistical characteristics of residual signal are different from those of transform coefficients, and no energy compaction around low-frequency components is observed. The residual coding is modified to account for the different signal characteristics of the (spatial) transform skip residual, which includes:
  the coefficient scanning is forward scan;
  no signalling of the last x/y position;
  coded_sub_block_flag is coded for every sub-block except for the DC sub-block when all previous coded_sub_block_flags are equal to 0;
  sig_coeff_flag context modelling with reduced template;
  abs_level_gtx_flag[0] and par_level_flag using only one context model respectively;
  additional greater than 5, 7, 9 flags;
  modified rice parameter derivation for the remainder binarization;
  sign flag coeff_sign_flag is context-coded, and context modeling for the sign flag is determined based on left and above neighboring coefficient values; also sign flag is parsed after sig_coeff_flag to keep all context-coded bins together.

Figure 6:
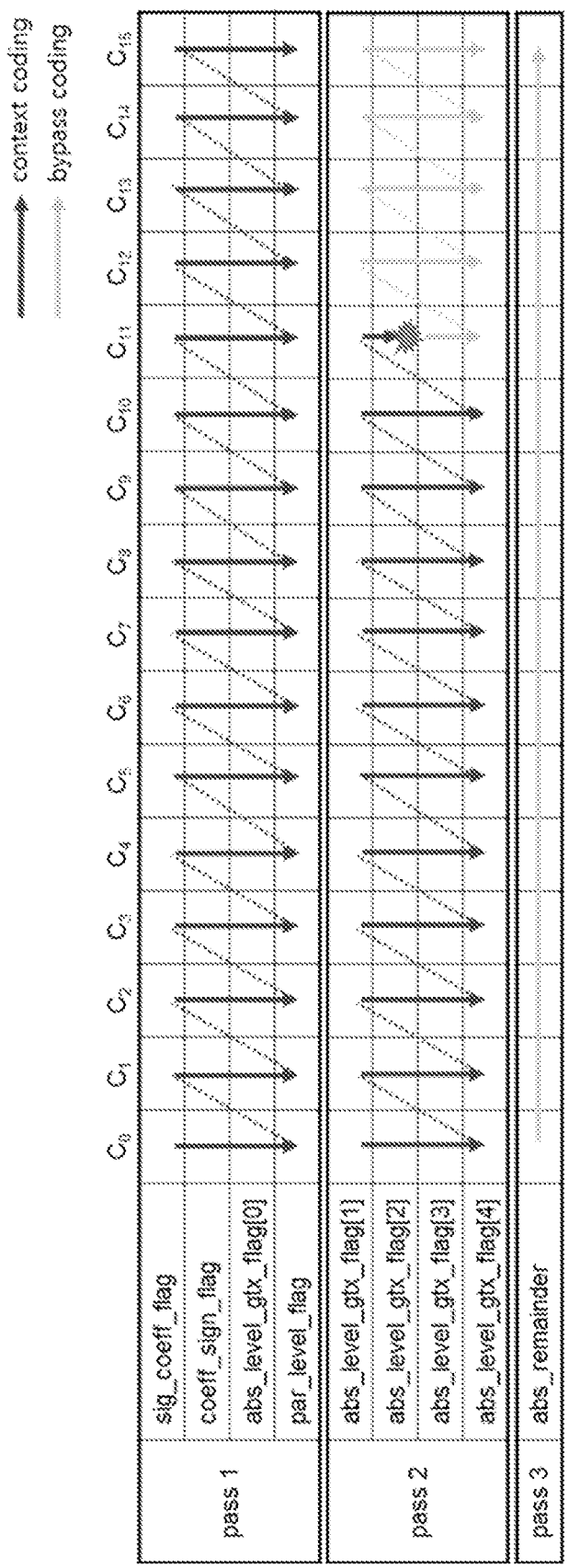
FIG. 6 illustrates the residual coding structure for transform skip blocks.

As shown in FIG. 6 and FIG. 8, if the significance of a CG is 1 (820), syntax elements sig_coeff_flag, coeff_sign_flag, abs_level_gtx_flag[0], par_level_flag, are coded interleaved, residual sample by residual sample, in the first pass (830-860), followed by abs_level_gtX_flag bitplanes, which are the second pass (870), and abs_remainder coding (880). The process is performed (890) for all sub-blocks in the transform block before it ends (899).
  Pass 1 (830-860): sig_coeff_flag, coeff_sign_flag, abs_level_gtx_flag[0], par_level_flag.
  Pass 2 (870): abs_level_gtx_flag[1], abs_level_gtx_flag[2] (greater than 5 flag). abs_level_gtx_flag[3] (greater than 7 flag), abs_level_gtx_flag[4] (greater than 9 flag).
  Pass 3 (880): abs_remainder.

In the transform skip mode, when the CCB count exceeds the maximum number, these remaining coefficient flags are bypass coded with the same syntax structure, which is completely different from transform residual case.

As mentioned above, the syntax used for CCB count, the maximum number of CCB count, and the syntax design after CCB count exceeds the maximum number, are different between the residual coding for transform blocks and transform skip blocks. Therefore, some unifications could be proposed here.

As described above, in order to restrict the maximum number of context-coded bins (CCB) per pixel, the area of the TB is used to derive the maximum number of context-coded bins for a TB in VVC Draft 6. Moreover, in the March 2019 meeting, the JVET adopted a new residual coding process for the transform skip residual block. This Transform Skip (TS) residual coding process is significantly different from the transform residual coding process of a transform block. The major differences between TS residual coding and transform residual coding about CCB are listed as follows:

1. In transform residual coding, the signs (coeff_sign_flag) is bypass coded and automatically is not included as a syntax used for CCB count. On the other hand, coeff_sign_flag is context-coded in TS residual coding, and is included as a syntax used for CCB count;
2. In transform residual coding, the maximum number of CCB is equal to TB_zosize*1.75 for a TB. On the other hand, in TS residual coding, the maximum number of CCB is equal to TB_size*2 for a TB.

To unify the CCB restrictions between the transform residual coding process and TS residual coding process, some unifications are proposed while maintaining most of the gain provided by the two separate residual coding structures employed for transform blocks and TS blocks.

In one embodiment, in TS residual coding, we exclude the coeff_sign_flag from CCB count so that syntax used for CCB count is unified for the two residual coding processes. In addition, a separate maximum number of context-coded bins can be specified and used for coeff_sign_flag only. In another embodiment, in TS residual coding, the maximum number of CCB count is reduced from TB_size*2 for a TB to TB_size*1.75. More generally, both the maximum CCB counts of the transform residual coding and TS residual coding are set to an identical value, so that the maximum CCB count is unified for the two residual coding processes. In the following, several methods unifying the CCB restrictions between the transform residual coding process and TS residual coding process are described in detail.

Unify the Syntax Used for CCB Count

In VVC Draft 6, coefficient flags such as sig_coeff_flag, abs_level_gtx_flag[0], par_level_flag, and abs_level_gtx_flag[1] are included in CCB count in the transform residual mode, as shown in steps 740 and 750 in FIG. 7. On the other hand, the coefficient flags such as sig_coeff_flag, coeff_sign_flag, abs_level_gtx_flag[0], par_level_flag, and abs_level_gtx_flag[j] ($1 \leq j \leq 4$) are included in CCB count in the transform skip residual mode as indicated in steps 830-870 in FIG. 8. There is a difference whether coeff_sign_flag is included in CCB count in these two modes. Table 1 shows the syntax structures of the two residual coding modes in VTM 6.0. As indicated in the Table 1, the residuals of a coding block are coded using non-overlapped sub-blocks (SubBlocks), and each sub-block contains 16 coefficients. For a given sub-block, coefficients are coded inside a loop (SubBlock loop) until all the coefficients in that sub-block can be reconstructed, before processing the next sub-block. For a given coefficient, syntaxes of the coefficient level are coded inside several passes. In each pass, after all the pre-defined syntaxes inside that pass of a coefficient are coded, it starts processing the next coefficient. The entropy coding/decoding of the residuals comprises up to three passes, which are used to code syntax elements in the following:

coded_sub_block_flag: specifies significance of a 16-coefficient sub-block (zero/nonzero).
sig_coeff_flag: specifies significance of a coefficient (zero/nonzero).
abs_level_gtx_flag[j]: specifies if the absolute value of a coefficient level is greater than (j<<1) +1.
par_level_flag: specifies the parity of the coefficient.
abs_remainder: specifies the remaining value for the absolute value of a coefficient level (if value is larger than what is coded in previous passes).
dec_abs_level: specifies the absolute value of a coefficient level (if coefficient is not coded in previous passes).
coeff_sign_flag: specifies the sign of a significant coefficient (0: positive, 1: negative).

TABLE 1 residual syntax structures of two residual coding modes in VTM 6.0

| Transform residual coding | TS residual coding |
|---|---|
| residual_coding( ) {<br>  MaxCcbs = (TbWidth_Zosize * TbHeight_Zosize *28) >> 4<br>  for( SubBlock loop ) {<br>    coded_sub_block_flag<br>    for( Pass 1 && MaxCcbs ≥ 4 ) {<br>      sig_coeff_flag<br>      abs_level_gtx_flag[0]<br>      par_level_flag<br>      abs_level_gtx_flag[1]<br>      MaxCcbs −= 4<br>    }<br>    for( Pass 2-1 ) {<br>      abs_remainder<br>    }<br>    for( Pass 2-2 ) {<br>      dec_abs_level<br>    }<br>    for( Pass 3 ) {<br>      coeff_sign_flag<br>    }<br>  }<br>} | residual_ts_coding( ) {<br>  MaxCcbs = 2 * TbWidth * TbHeight<br>  for( SubBlock loop ) {<br>    coded_sub_block_flag<br>    for( Pass 1) {<br>      sig_coeff_flag<br>      MaxCcbs −= 1<br>      coeff_sign_flag<br>      MaxCcbs −= 1<br>      abs_level_gtx_flag[0]<br>      MaxCcbs −= 1<br>      par_level_flag<br>      MaxCcbs −= 1<br>    }<br>    for( Pass 2 ) {<br>      for( j=1; j<5; j++ ) {<br>        abs_level_gtx_flag[j]<br>        MaxCcbs −= 1<br>      }<br>    }<br>    for( Pass 3 ) {<br>      abs_remainder<br>    }<br>  }<br>} |

Count CCB (transform residual coding): spans Pass 1 through Pass 3.
Count CCB (TS residual coding): spans Pass 1 through Pass 2.

The detailed syntax table of transform skip residual coding in VVC Draft 6 is presented in Table 2.

TABLE 2 syntax table of transform skip residual coding in VVC Draft 6

|  | Descriptor |
|---|---|
| residual_ts_coding( x0, y0, log2TbWidth, log2TbHeight, cIdx ) { | |
|   log2SbSize = ( Min( log2TbWidth, log2TbHeight ) <2 ? 1 : 2 ) | |
|   numSbCoeff = 1 << ( log2SbSize << 1 ) | |
|   lastSubBlock = ( 1 << ( log2TbWidth + log2TbHeight − 2 * log2SbSize ) ) − 1 | |
|   inferSbCbf = 1 | |
|   MaxCcbs = 2 * ( 1 << log2TbWidth ) * ( 1<< log2TbHeight ) | |
|   for( i = 0; i <= lastSubBlock; i ++ ) { | |
|     xS = DiagScanOrder[ log2TbWidth − log2SbSize ][ log2TbHeight − log2SbSize ][ i ][ 0 ] | |
|     yS = DiagScanOrder[ log2TbWidth − log2SbSize ][ log2TbHeight − log2SbSize ][ i ][ 1 ] | |
|     if( ( i != lastSubBlock | | !inferSbCbf ) { | |
|       coded_sub_block_flag[ xS ][ yS ] | ae(v) |
|     } | |
|     if( coded_sub_block_flag[ xS ][ yS ] && i < lastSubBlock ) | |
|       inferSbCbf = 0 | |
|   /* First scan pass */ | |
|     inferSbSigCoeffFlag = 1 | |
|     for( n = 0; n <= numSbCoeff − 1; n++ ) { | |
|       xC = ( xS << log2SbSize ) + DiagScanOrder[ log2SbSize ][ log2SbSize ][ n ][ 0 ] | |
|       yC = ( yS << log2SbSize ) + DiagScanOrder[ log2SbSize ][ log2SbSize ][ n ][ 1 ] | |
|       if( coded_sub_block_flag[ xS ][ yS ] && | |
|         ( n != numSbCoeff − 1 | | !inferSbSigCoeffFlag ) ) { | |
|         sig_coeff_flag[ xC ][ yC ] | ae(v) |
|         MaxCcbs- - | |
|         if( sig_coeff_flag[ xC ][ yC ] ) | |
|           inferSbSigCoeffFlag = 0 | |
|       } | |
|       CoeffSignLevel[ xC ][ yC ] = 0 | |
|       if( sig_coeff_flag[ xC ][ yC ] { | |
|         coeff_sign_flag[ n ] | ae(v) |
|         MaxCcbs- - | |
|         CoeffSignLevel[ xC ][ yC ] = ( coeff_sign_flag[ n ] > 0 ? −1 : 1 ) | |
|         abs_level_gtx_flag[ n ][ 0 ] | ae(v) |
|         MaxCcbs- - | |
|         if( abs_level_gtx_flag[ n ][ 0 ] ) { | |
|           par_level_flag[ n ] | ae(v) |
|           MaxCcbs- - | |
|         } | |
|       } | |
|       AbsLevelPassX[ xC ][ yC ] = | |
|         sig_coeff_flag[ xC ][ yC ] + par_level_flag[ n ] + abs_level_gtx_flag[ n ][ 0 ] | |
|     } | |
|   /* Greater than X scan pass (numGtXFlags=5) */ | |
|     for( n = 0; n <= numSbCoeff − 1; n++ ) { | |
|       xC = ( xS << log2SbSize ) + DiagScanOrder[ log2SbSize ][ log2SbSize ][ n ][ 0 ] | |
|       yC = ( yS << log2SbSize ) + DiagScanOrder[ log2SbSize ][ log2SbSize ][ n ][ 1 ] | |
|       for( j = 1; j < 5; j++ ) { | |
|         if( abs_level_gtx_flag[ n ][ j − 1 ] ) | |
|           abs_level_gtx_flag[ n ][ j ] | ae(v) |
|         MaxCcbs- - | |
|         AbsLevelPassX[ xC ][ yC ] + = 2 * abs_level_gtx_flag[ n ][ j ] | |
|       } | |
|     } | |
|   /* remainder scan pass */ | |
|     for( n = 0; n <= numSbCoeff − 1; n++ ) { | |
|       xC = ( xS << log2SbSize ) + DiagScanOrder[ log2SbSize ][ log2SbSize ][ n ][ 0 ] | |
|       yC = ( yS << log2SbSize ) + DiagScanOrder[ log2SbSize ][ log2SbSize ][ n ][ 1 ] | |
|       if( abs_level_gtx_flag[ n ][ 4 ] ) | |
|         abs_remainder[ n ] | ae(v) |
|       if( intra_bdpcm_flag = = 0 ) { | |
|         absRightCoeff = abs( TransCoeffLevel[ x0 ][ y0 ][ cIdx ][ xC − 1 ][ yC ] ) | |
|         absBelowCoeff = abs( TransCoeffLevel[ x0 ][ y0 ][ cIdx ][ xC ][ yC − 1 ] ) | |
|         predCoeff = Max( absRightCoeff, absBelowCoeff ) | |
|         if( AbsLevelPassX[ xC ][ yC ] + abs_remainder[ n ] = = 1 && predCoeff > 0 ) | |
|           TransCoeffLevel[ x0 ][ y0 ][ cIdx ][ xC ][ yC ] ) = | |
|             ( 1 − 2 * coeff_sign_flag[ n ] ) * predCoeff | |
|         else if( AbsLevelPassX[ xC ][ yC ] + abs_remainder[ n ] <= predCoeff ) | |
|           TransCoeffLevel[ x0 ][ y0 ][ cIdx ][ xC ][ yC ] ) = ( 1 − 2 * coeff_sign_flag[ n ] ) * | |
|             ( AbsLevelPassX[ xC ][ yC ] + abs_remainder[ n ] − 1) | |
|         else | |
|           TransCoeffLevel[ x0 ][ y0 ][ cIdx ][ xC ][ yC ] = ( 1 − 2 * | |

TABLE 2-continued syntax table of transform skip residual coding in VVC Draft 6

| | Descriptor |
|---|---|
| ```
            coeff_sign_flag[ n ] ) *
               ( AbsLevelPassX[ xC ][ yC] + abs_remainder[ n ] )
      } else
         TransCoeffLevel[ x0 ][ y0 ][ cIdx ][ xC ][ yC ] = ( 1 − 2 *
         coeff_sign_flag[ n ] ) *
               ( AbsLevelPassX[ xC ][ yC ] + abs_remainder[ n ] )
      }
   }
}
``` | |

Figure 9:
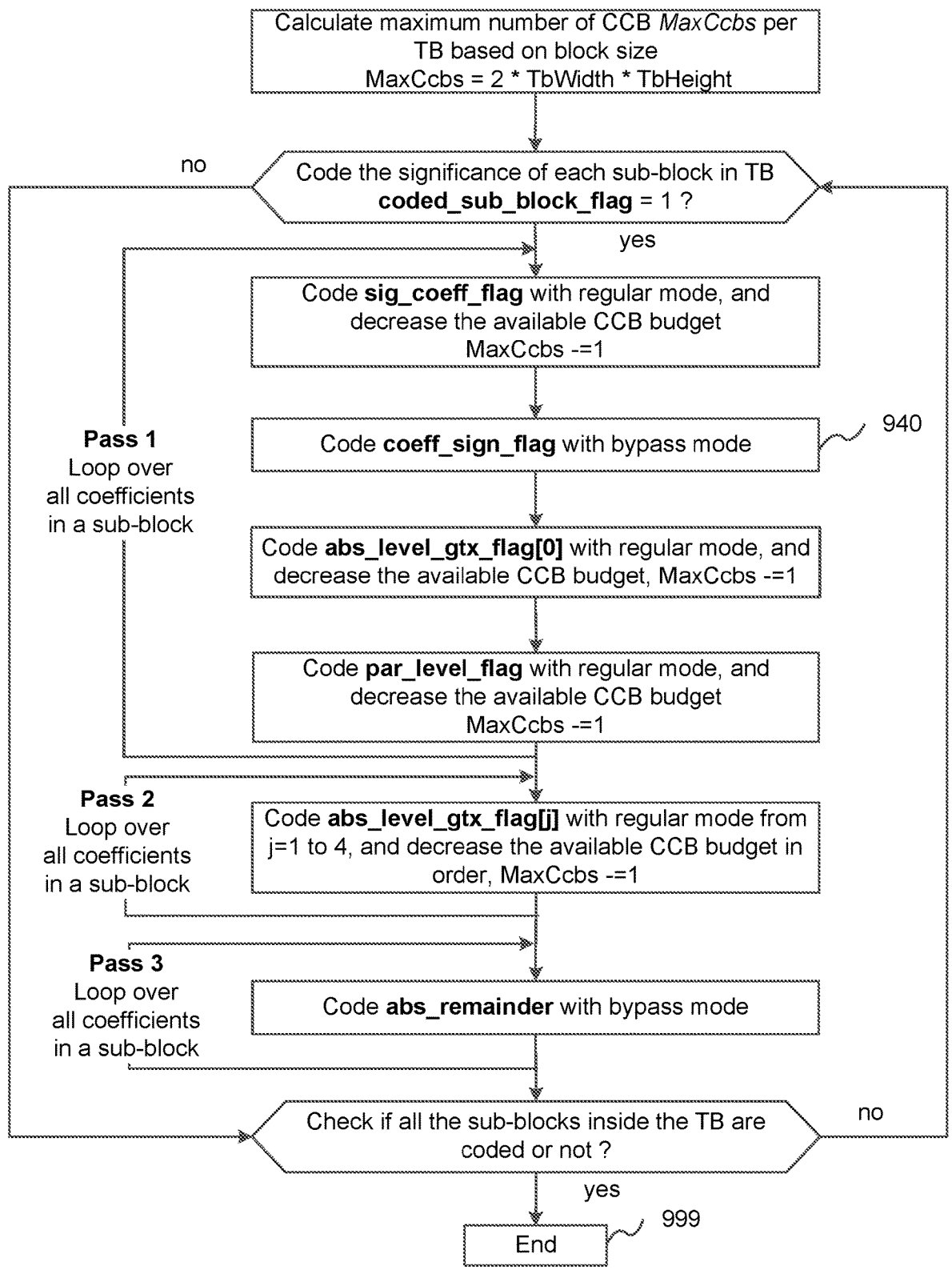
FIG. 9 illustrates the residual coding process for a transform skip block, according to an embodiment.

As aforementioned, the coeff_sign_flag is context coded and included in the CCB count in the TS residual mode as shown in step 840 in FIG. 8. In one embodiment, it is proposed to exclude the coeff_sign_flag from the CCB count in the TS residual mode as shown in FIG. 9 and also in Table 3, where the change relative to VTM 6.0 is underlined. The proposed syntax table of transform skip residual coding is presented in Table 4, where the change relative to VVC Draft 6 is strikethrough (i.e., "MaxCcbs--" is removed after coeff_sign_flag is signaled (940), other steps in FIG. 9 are the same as those in FIG. 8). According to a variant of this embodiment, it is proposed to exclude the abs_level_gtx_flag[j] (j>1) from CCB count in TS residual coding.

TABLE 3 proposed residual syntax structures for two residual coding modes

| Transform residual coding | TS residual coding |
|---|---|
| ```
residual_coding( ) {
   MaxCcbs = (TbWidth_Zosize * TbHeight_Zosize *28) >> 4
   for( SubBlock loop ) {
      coded_sub_block_flag
      for( Pass 1 && MaxCcbs ≥ 4 ) {
         sig_coeff_flag
         abs_level_gtx_flag[0]
         par_level_flag
         abs_level_gtx_flag[1]
         MaxCcbs −= 4
      }
      for( Pass 2-1 ) {
         abs_remainder
      }
      for( Pass 2-2 ) {
         dec_abs_level
      }
      for( Pass 3 ) {
         coeff_sign_flag
      }
   }
}
``` ↕ Count CCB | ```
residual_ts_coding( ) {
   MaxCcbs = 2 * TbWidth * TbHeight
   for( SubBlock loop ) {
      coded_sub_block_flag
      for( Pass 1 ) {
         sig_coeff_flag                 ↕ Count CCB
         MaxCcbs −= 1
         coeff_sign_flag
         abs_level_gtx_flag[0]
         MaxCcbs −= 1
         par_level_flag
         MaxCcbs −= 1
      }
      for( Pass 2 ) {                    ↕ Count CCB
         for( j=1; j<5; j++ ) {
            abs_level_gtx_flag[j]
            MaxCcbs −= 1
         }
      }
      for( Pass 3 ) {
         abs_remainder
      }
   }
}
``` |

TABLE 4 proposed syntax table of transform skip residual coding

| | Descriptor |
|---|---|
| residual_ts_coding( x0, y0, log2TbWidth, log2TbHeight, cIdx ) { | |
| ... | |
|    CoeffSignLevel[ xC ][ yC ] = 0 | |
|    if( sig_coeff_flag[ xC ][ yC ] { | |
|      coeff_sign_flag[ n ] | ae(v) |
|      ~~MaxCcbs- -~~ | |

TABLE 4-continued proposed syntax table of transform skip residual coding

| | Descriptor |
|---|---|
|    CoeffSignLevel[ xC ][ yC ] = | |
|    ( coeff_sign_flag[ n ] > 0 ? −1 : 1 ) | |
|    abs_level_gtx_flag[ n ][ 0 ] | ae(v) |
|    MaxCcbs- - | |
|    if( abs_level_gtx_flag[ n ][ 0 ] ) { | |
|      par_level_flag[ n ] | ae(v) |
|      MaxCcbs- - | |
| } | |
| } | |
| ... | |

Unify the Maximum Number of CCB Count

In VVC Draft 6, as shown in Table 1 (also indicated in FIG. 7 and FIG. 8), it limits the number of context-coded bins per coefficient for luma and chroma coefficients to be 1.75 bins/coefficient at the TB level as shown in step 710 in FIG. 7. On the other hand, TS residual coding sets this limit to 2 bins/coefficient at the TB level as shown in step 810 in FIG. 8.

Figure 10:
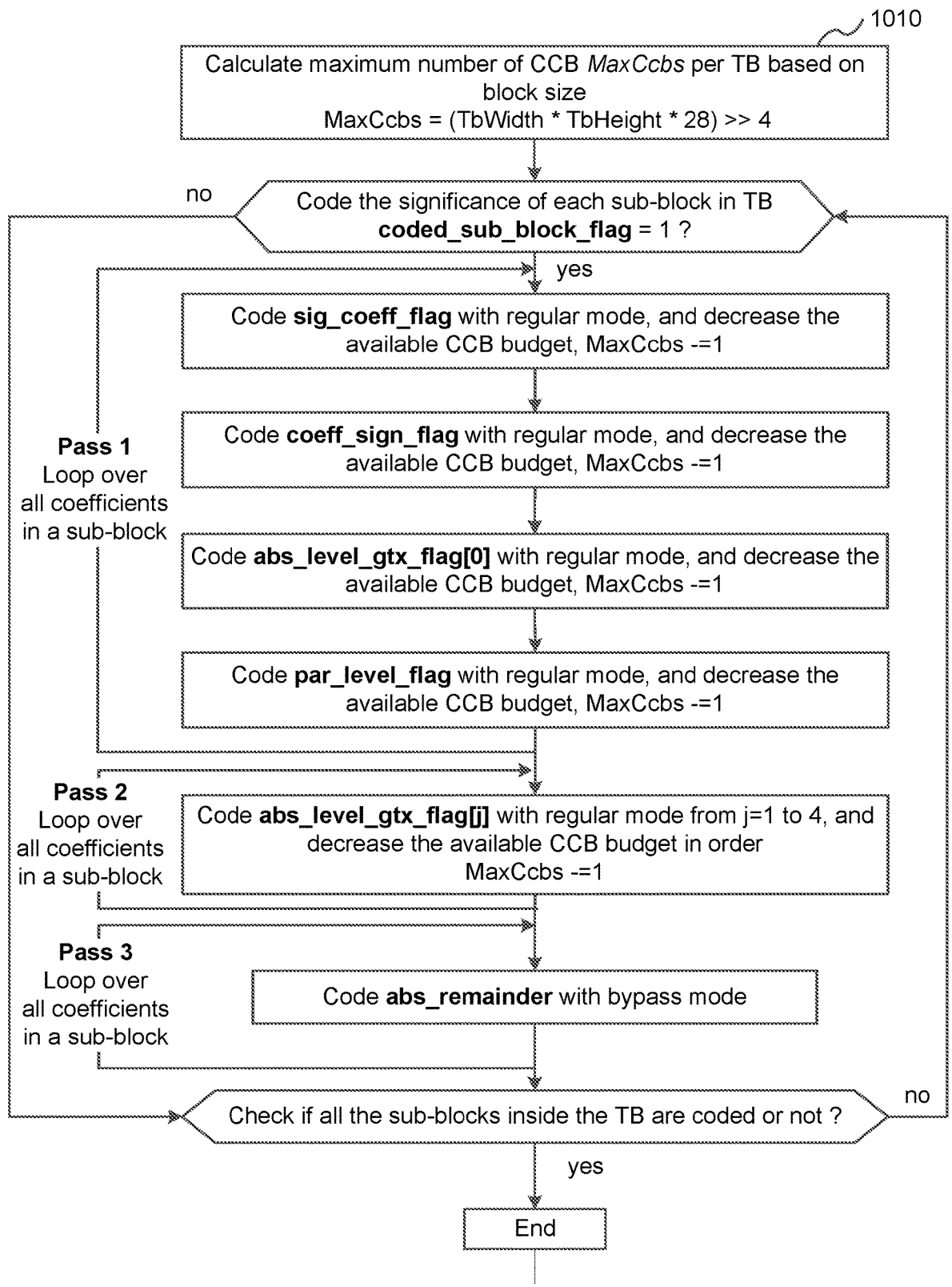
FIG. 10 illustrates the residual coding process for a transform skip block, according to another embodiment.

Another unification proposed here is to align the maximum allowed number of context-coded bins per coefficient for transform residual coding and TS residual coding, for example, by assigning 1.75 bins/coefficient at the TB level as shown in step 1010 in FIG. 10 (other steps in FIG. 10 are the same as those in FIG. 8). It is desirable to lower the worst case number of context-coded bins per residual from 2 to 1.75 in the TS residual coding. This change would improve the overall CABAC throughput and make the CABAC restrictions more consistent. Table 5 shows the maximum number of CCB assignments of the two residual coding modes as proposed in this embodiment, where the change relative to VTM 6.0 is underlined. The proposed syntax table about the maximum number CCB count assignment of transform skip residual coding is presented in Table 6, where the change relative to VVC Draft 6 is underlined.

TABLE 5 the proposed maximum number CCB count assignment

| Transform residual coding | TS residual coding |
|---|---|
| residual_coding( ) {<br>  MaxCcbs = (TbWidth_Zosize * TbHeight_Zosize *28) >> 4<br>  for( SubBlock loop ) {<br>    coded_sub_block_flag<br>    for( Pass 1 && MaxCcbs ≥ 4 ) {<br>      sig_coeff_flag<br>      abs_level_gtx_flag[0]<br>      par_level_flag        Count CCB<br>      abs_level_gtx_flag[1]<br>      MaxCcbs -= 4<br>    }<br>    for( Pass 2-1 ) {<br>      abs_remainder<br>    }<br>    for( Pass 2-2 ) {<br>      dec_abs_level<br>    }<br>    for( Pass 3 ) {<br>      coeff_sign_flag<br>    }<br>  }<br>} | residual_ts_coding( ) {<br>  MaxCcbs = (TbWidth * TbHeight * 28) >> 4<br>  for( SubBlock loop) {<br>    coded_sub_block_flag<br>    for( Pass 1 ) {<br>      sig_coeff_flag<br>      MaxCcbs -= 1<br>      coeff_sign_flag<br>      MaxCcbs -= 1<br>      abs_level_gtx_flag[0]<br>      MaxCcbs -= 1<br>      par_level_flag        Count CCB<br>      MaxCcbs -= 1<br>    }<br>    for( Pass 2 ) {<br>      for( j=1; j<5; j++ ) {<br>        abs_level_gtx_flag[j]<br>        MaxCcbs -= 1<br>      }<br>    }<br>    for( Pass 3 ) {<br>      abs_remainder<br>    }<br>  }<br>} |

TABLE 6 proposed syntax table about the maximum number CCB count assignment of transform skip residual coding

| | Descriptor |
|---|---|
| residual_ts_coding( x0, y0, log2TbWidth, log2TbHeight, cIdx ) {<br>  log2SbSize = ( Min( log2TbWidth, log2TbHeight ) < 2 ? 1 : 2 )<br>  numSbCoeff = 1 << ( log2SbSize << 1 )<br>  lastSubBlock = ( 1 << ( log2TbWidth + log2TbHeight − 2 * log2SbSize ) ) − 1 | |

TABLE 6-continued proposed syntax table about the maximum number CCB count assignment of transform skip residual coding

| | Descriptor |
|---|---|
|   inferSbCbf = 1<br>  MaxCcbs = ( 28 * ( 1 << log2TbWidth ) * ( 1<< log2TbHeight ) ) >> 4<br>  ... | |

According to a variant of the second embodiment, the maximum allowed number of context-coded bins per coefficient for transform residual coding and TS residual coding can be aligned by assigning another value x rather than 1.75 bins/coefficient at the TB level.

According to another variant of the second embodiment, the second embodiment can be combined with the first embodiment, which reduces the maximum number of CCB to 1.75 bins for other residual syntaxes except coeff_sign_flag.

Assign Another Number of Context-Coded Bins CCB_SIGN for Coeff_Sign_Flag

According to the first embodiment, the coeff_sign_flag is proposed to be excluded from the CCB count in the TS residual mode. As it increases the worst case number of context-coded bins per residual to be more than 2 in the TS residual coding, it would reduce the overall CABAC throughput.

In order to compensate this drawback, one solution is to combine the aforementioned embodiments as described in Table 3 and Table 5, which reduces the maximum number of CCB for other residual syntaxes except coeff_sign_flag. Another solution is to assign another number of context-coded bins CCB_SIGN for coeff_sign_flag. In this case, the CABAC throughput of coeff_sign_flag can be controlled independently.

Figure 11:
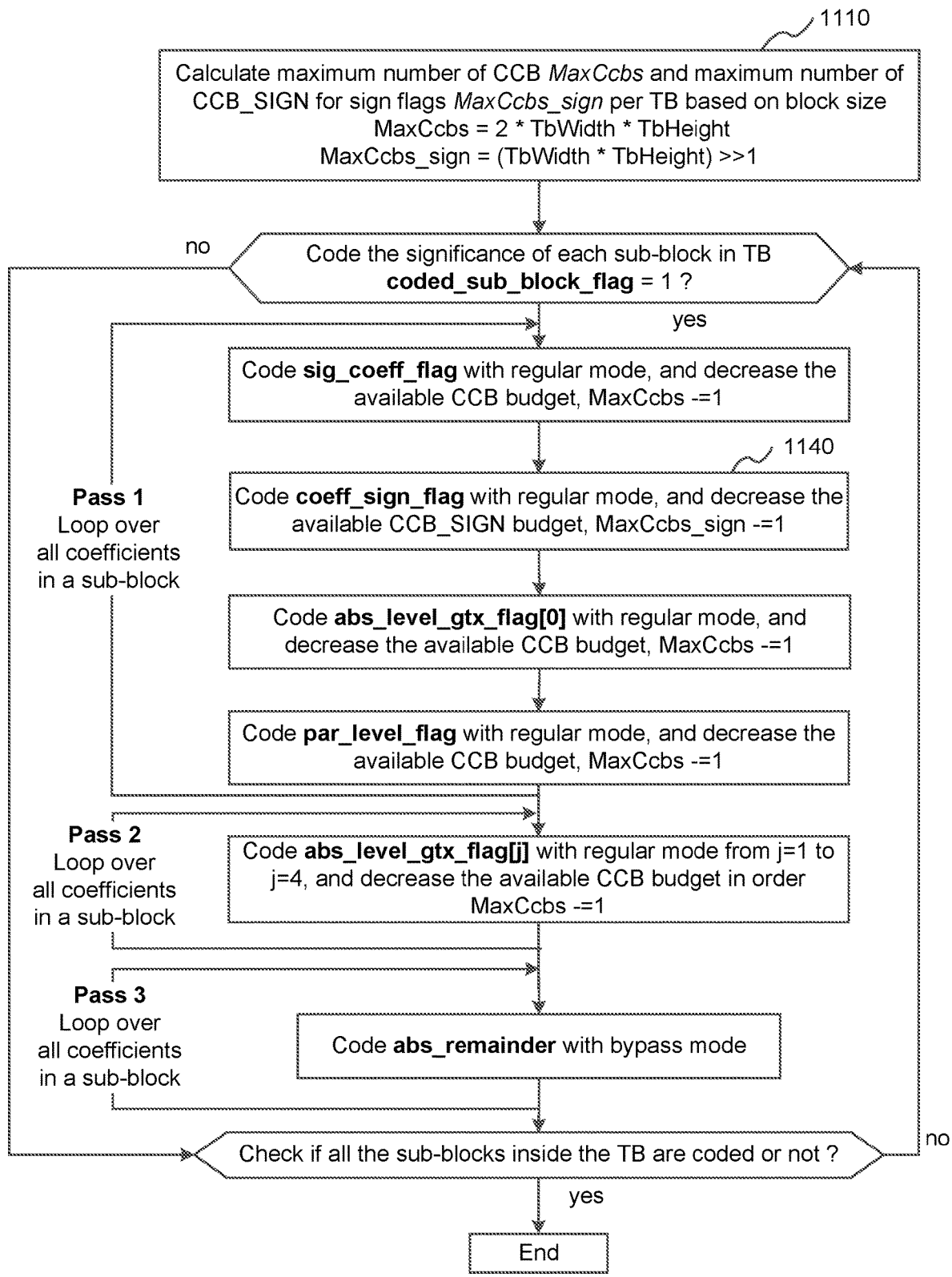
FIG. 11 illustrates the residual coding process for a transform skip block, according to another embodiment.

The area of the TB can be used to derive the maximum number of context-coded bins CCB_SIGN for coeff_sign_flag in a TB. For example, the maximum number of CCB_SIGN can be equal to TB_size*0.5 as shown in step 1110 in FIG. 11. Here, TB_size indicates the number of samples within a TB, as shown in Table 7, where the changes relative to VTM 6.0 are underlined. As indicated in step 1140 in FIG. 11, the new CCB count MaxCcbs_sign, rather than MaxCcbs, is used for coeff_sign_flag (steps other than 1110 and 1140 in FIG. 11 are the same as those in FIG. 8). The proposed syntax table of transform skip residual coding with additional CCB_SIGN is presented in Table 8, where the changes relative to VVC Draft 6 are strikethrough or underlined.

According to a variant of the third embodiment, it can be applied together with the second embodiment. According to a variant of the third embodiment, the CCB_SIGN can also be set and applied in a CG level.

TABLE 8-continued proposed syntax table of transform skip residual coding with additional CCB_SIGN

| | Descriptor |
|---|---|
| par_level_flag[ n ] | ae(v) |
| MaxCcbs- - | |
| } | |
| ... | |

It is noted that the methods as described in FIGS. 7-11 can be used at the encoder or decoder side. When used in the encoder side, the term "code" in the figures can be understood as "encode"; when used in the decoder side, the term "code" in the figures can be understood as "decode." For FIGS. 9-11 where the residual coding processes are illustrated, when used at the encoder side, the quantized prediction residuals of a transform skip block are used as input and the coded prediction residuals are output. When FIGS. 9-11 are used to illustrate the residual coding processes at the

TABLE 7 proposed residual syntax structures with additional CCB_SIGN

| Transform residual coding | TS residual coding |
|---|---|
| residual_coding( ) { <br>   MaxCcbs = (TbWidth_Zosize * TbHeight_Zosize *28) >> 4 <br>   for( SubBlock loop ) { <br>     coded_sub_block_flag <br>     for( Pass 1 && MaxCcbs ≥ 4 ) { <br>       sig_coeff_flag <br>       abs_level_gtx_flag[0] <br>       par_level_flag             Count CCB <br>       abs_level_gtx_flag[1] <br>       MaxCcbs -= 4 <br>     } <br>     for( Pass 2-1 ) { <br>       abs_remainder <br>     } <br>     for( Pass 2-2 ) { <br>       dec_abs_level <br>     } <br>     for( Pass 3 ) { <br>       coeff_sign_flag <br>     } <br>   } <br> } | residual_ts_coding( ) { <br>   MaxCcbs = 2 * TbWidth * TbHeight <br>   MaxCcbs_sign = (TbWidth * TbHeight) >> 1 <br>   for( SubBlock loop ) { <br>     coded_sub_block_flag <br>     for( Pass 1 ) { <br>       sig_coeff_flag           Count CCB <br>       MaxCcbs -= 1 <br>       coeff_sign_flag <br>       MaxCcbs_sign --     Count CCB_SIGN <br>       abs_level_gtx_flag[0] <br>       MaxCcbs -= 1 <br>       par_level_flag <br>       MaxCcbs -= 1 <br>     } <br>     for( Pass 2 ) {           Count CCB <br>       for( j=1; j<5; j++ ) { <br>         abs_level_gtx_flag[j] <br>         MaxCcbs -= 1 <br>       } <br>     } <br>     for( Pass 3 ) } <br>       abs_remainder <br>     } <br>   } <br> } |

TABLE 8 proposed syntax table of transform skip residual coding with additional CCB_SIGN

| | Descriptor |
|---|---|
| residual_ts_coding( x0, y0, log2TbWidth, log2TbHeight, cIdx ) { <br> ... <br>   CoeffSignLevel[ xC ][ yC ] = 0 <br>   if( sig_coeff_flag[ xC ][ yC ] ) { <br>     coeff_sign_flag[ n ] <br>     MaxCcbs- - <br>     MaxCcbs_sign - - <br>     CoeffSignLevel[ xC ][ yC ] = <br>     ( coeff_sign_flag[ n ] > 0 ? -1 : 1 ) <br>     abs_level_gtx_flag[ n ][ 0 ] <br>     MaxCcbs- - <br>     if( abs_level_gtx_flag[ n ][ 0 ] ) { | <br><br><br><br> ae(v) <br><br><br><br><br> ae(v) | decoder side, the bins corresponding to quantized prediction residuals in the bitstream are decoded and the quantized prediction residuals are output for a transform skip block.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, the entropy encoding and decoding modules (245, 330), of a video encoder 200 and decoder 300 as shown in FIG. 2 and FIG. 3. Moreover, the present aspects are not limited to VVC or HEVC, and can be applied, for example, to other standards and recommendations, and extensions of any such standards and recommendations. Unless indicated otherwise, or technically precluded, the aspects described in this application can be used individually or in combination.

Various numeric values are used in the present application. The specific values are for example purposes and the aspects described are not limited to these specific values.

An embodiment provides a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video sequence in order to produce an encoded bitstream.

Note that the syntax elements as used herein are descriptive terms. As such, they do not preclude the use of other syntax element names.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method of video encoding, comprising:
    obtaining prediction residuals, for a block in a picture, to be encoded with a transform skip residual coding process;
    counting a first number of context-coded bins used to encode a set of syntax elements associated with level information of said prediction residuals in said block, during said transform skip residual coding process, wherein said set of syntax elements indicates, for a prediction residual, at least one of significance of said prediction residual, whether an absolute value of said prediction residual is greater than a value and a parity of said prediction residual, wherein a maximum number of context-coded bins is used to limit said first number of context-coded bins, and wherein said set of syntax elements are context coded before said first number of context-coded bins reaches said maximum number of context-coded bins and then are bypass coded after said first number of context-coded bins exceeds said maximum number of context-coded bins;
    counting a second number of context-coded bins used to encode a set of syntax flags indicating signs of significant prediction residuals in said block, during said transform skip residual coding process, wherein another maximum number of context-coded bins is used to limit said second number of context-coded bins, and wherein said set of syntax flags are context coded before said second number of context-coded bins reaches said another maximum number of context-coded bins and then are bypass coded after said second number of context-coded bins exceeds said another maximum number of context-coded bins; and
    entropy encoding said set of syntax elements and said set of syntax flags for said prediction residuals of said block.

2. The method of claim 1, wherein said maximum number of context-coded bins is set to 1.75*TB_size, where TB_size indicates a number of samples in said block.

3. The method of claim 1, wherein a syntax element indicating whether an absolute level of a prediction residual is greater than a value is excluded from counting said first number of context-coded bins.

4. The method of claim 1, wherein said another maximum number of context-coded bins depends on TB_size, where TB_size indicates a number of samples in said block.

5. The method of claim 4, wherein said another maximum number of context-coded bins is set to 0.5*TB_size.

6. An apparatus for video encoding, comprising one or more processors, wherein said one or more processors are configured to:
    obtain prediction residuals, for a block in a picture, to be encoded with a transform skip residual coding process;
    count a first number of context-coded bins used to encode a set of syntax elements associated with level information of said prediction residuals in said block, during said transform skip residual coding process, wherein said set of syntax elements indicates, for a prediction residual, at least one of significance of said prediction residual, whether an absolute value of said prediction residual is greater than a value and a parity of said prediction residual, wherein a maximum number of context-coded bins is used to limit said first number of context-coded bins, and wherein said set of syntax elements are context coded before said first number of context-coded bins reaches said maximum number of context-coded bins and then are bypass coded after said first number of context-coded bins exceeds said maximum number of context-coded bins;
    count a second number of context-coded bins used to encode a set of syntax flags indicating signs of significant prediction residuals in said block, during said transform skip residual coding process, wherein another maximum number of context-coded bins is used to limit said second number of context-coded bins, and wherein said set of syntax flags are context coded before said second number of context-coded bins reaches said another maximum number of context-coded bins and then are bypass coded after said second number of context-coded bins exceeds said another maximum number of context-coded bins; and
    entropy encode said set of syntax elements and said set of syntax flags for said prediction residuals of said block.

7. The apparatus of claim 6, wherein said maximum number of context-coded bins is set to 1.75*TB_size, where TB_size indicates a number of samples in said block.

8. The apparatus of claim 6, wherein a syntax element indicating whether an absolute level of a prediction residual is greater than a value is excluded from counting said first number of context-coded bins.

9. The apparatus of claim 6, wherein said another maximum number of context-coded bins depends on TB_size, where TB_size indicates a number of samples in said block.

10. The apparatus of claim 9, wherein said another maximum number of context-coded bins is set to 0.5*TB size.

11. A method of video decoding, comprising:
    counting a first number of context-coded bins used to decode a set of syntax elements associated with prediction residuals in a block, during a transform skip residual coding process, wherein said set of syntax elements indicates, for a prediction residual, at least one of significance of said prediction residual, whether an absolute value of said prediction residual is greater than a value and a parity of said prediction residual, wherein a maximum number of context-coded bins is used to limit said first number of context-coded bins, and wherein said set of syntax elements are context coded before said first number of context-coded bins reaches said maximum number of context-coded bins and then are bypass coded after said first number of context-coded bins exceeds said maximum number of context-coded bins;
    counting a second number of context-coded bins used to decode a set of syntax flags indicating signs of significant prediction residuals in said block, during said transform skip residual coding process, wherein another maximum number of context-coded bins is used to limit said second number of context-coded bins, and wherein said set of syntax flags are context coded before said second number of context-coded bins reaches said another maximum number of context-coded bins and then are bypass coded after said second number of context-coded bins exceeds said another maximum number of context-coded bins; and
    entropy decoding said set of syntax elements and said set of syntax flags for said prediction residuals of said block.

12. The method of claim 11, wherein said maximum number of context-coded bins is set to 1.75*TB size, where TB_size indicates a number of samples in said block.

13. The method of claim 11, wherein a syntax element indicating whether an absolute level of a prediction residual is greater than a value is excluded from counting said first number of context-coded bins.

14. The method of claim 11, wherein said another maximum number of context-coded bins depends on TB_size, where TB_size indicates a number of samples in said block.

15. The method of claim 14, wherein said another maximum number of context-coded bins is set to 0.5*TB size.

16. An apparatus for video decoding, comprising one or more processors, wherein said one or more processors are configured to:
    count a first number of context-coded bins used to decode a set of syntax elements associated with prediction residuals in a block, during a transform skip residual coding process, wherein said set of syntax elements indicates, for a prediction residual, at least one of significance of said prediction residual, whether an absolute value of said prediction residual is greater than a value and a parity of said prediction residual, wherein a maximum number of context-coded bins is used to limit said first number of context-coded bins, and wherein said set of syntax elements are context coded before said first number of context-coded bins reaches said maximum number of context-coded bins and then are bypass coded after said first number of context-coded bins exceeds said maximum number of context-coded bins;
    count a second number of context-coded bins used to decode a set of syntax flags indicating signs of significant prediction residuals in said block, during said transform skip residual coding process, wherein another maximum number of context-coded bins is used to limit said second number of context-coded bins, and wherein said set of syntax flags are context coded before said second number of context-coded bins reaches said another maximum number of context-coded bins and then are bypass coded after said second number of context-coded bins exceeds said another maximum number of context-coded bins; and
    entropy decode said set of syntax elements and said set of syntax flags for said prediction residuals of said block.

17. The apparatus of claim 16, wherein said maximum number of context-coded bins is set to 1.75*TB size, where TB_size indicates a number of samples in said block.

18. The apparatus of claim 16, wherein said another maximum number of context-coded bins depends on TB_size, where TB_size indicates a number of samples in said block.

19. The apparatus of claim 16, wherein said another maximum number of context-coded bins is set to 0.5*TB size.

* * * * *